United States Patent [19]

Wells et al.

[11] 4,292,888

[45] Oct. 6, 1981

[54] FOUNTAIN PUMP FOR ELECTRIC COFFEE PERCOLATORS

[76] Inventors: Alton R. Wells, 1500 S.W. 40th St., Ft. Lauderdale, Fla. 33315; Robert M. Wells, 4371 Ira Rd., Akron, Ohio 44313; James L. Heir, 11515 Stafford Rd., Trumbull County, Burton, Ohio 44021

[21] Appl. No.: 84,666

[22] Filed: Oct. 15, 1979

Related U.S. Application Data

[63] Continuation-in-part of Ser. No. 877,315, Feb. 13, 1978, abandoned, which is a continuation-in-part of Ser. No. 704,461, Jul. 12, 1976, abandoned.

[51] Int. Cl.³ ............... H05B 1/02; A47J 31/053; F04B 19/24
[52] U.S. Cl. .................................... 99/312; 99/281; 99/288; 219/296; 219/306; 219/437; 219/441; 417/208
[58] Field of Search ............... 219/441, 442, 335, 336, 219/437, 523, 436, 438, 296, 306; 99/281, 282, 288, 302–315; 417/207–209

[56] References Cited

U.S. PATENT DOCUMENTS

| | | | |
|---|---|---|---|
| 1,778,926 | 10/1930 | Wiegand | 417/208 X |
| 1,782,958 | 11/1930 | Dym | 99/312 UX |
| 1,943,386 | 1/1934 | Johnson | 99/312 |
| 1,974,676 | 9/1934 | Hubbard | 417/208 |
| 1,976,196 | 10/1934 | Sawyer | 219/441 |
| 2,151,966 | 3/1939 | Harper | 99/313 X |
| 2,515,385 | 7/1950 | Wales | 99/281 X |
| 2,702,337 | 2/1955 | Drumm | 219/441 |
| 2,843,720 | 7/1958 | Young | 99/281 X |
| 3,129,318 | 4/1964 | Morrison | 99/310 X |

FOREIGN PATENT DOCUMENTS

| | | | |
|---|---|---|---|
| 740080 | 8/1966 | Canada | 99/312 |
| 186853 | 10/1922 | United Kingdom | 99/312 |

*Primary Examiner*—A. Bartis
*Attorney, Agent, or Firm*—Oldham, Oldham, Hudak & Weber Co.

[57] ABSTRACT

A coffee brewing device of the percolator type. Fundamentally, the invention comprises a pot for receiving liquid therein and having positioned at the bottom thereof a cylindrical pump member characterized by an essentially flat top and by a tubular pump chamber of greater radial length than the vertical depth of the pump chamber at the top of the pump member. Six to ten uniform holes or orifices of a total area of between about 0.0258 and 0.043 square inches are provided in uniformly spaced relationship about the bottom of the pump assembly. Received within the pump is a dual element fat-topped heater consisting of a core having two heating element wires wrapped thereabout in a parallel spiraling fashion. The flat top of the pump member is spaced from between 1/16" and ⅛" from the flat top of the heater.

3 Claims, 3 Drawing Figures

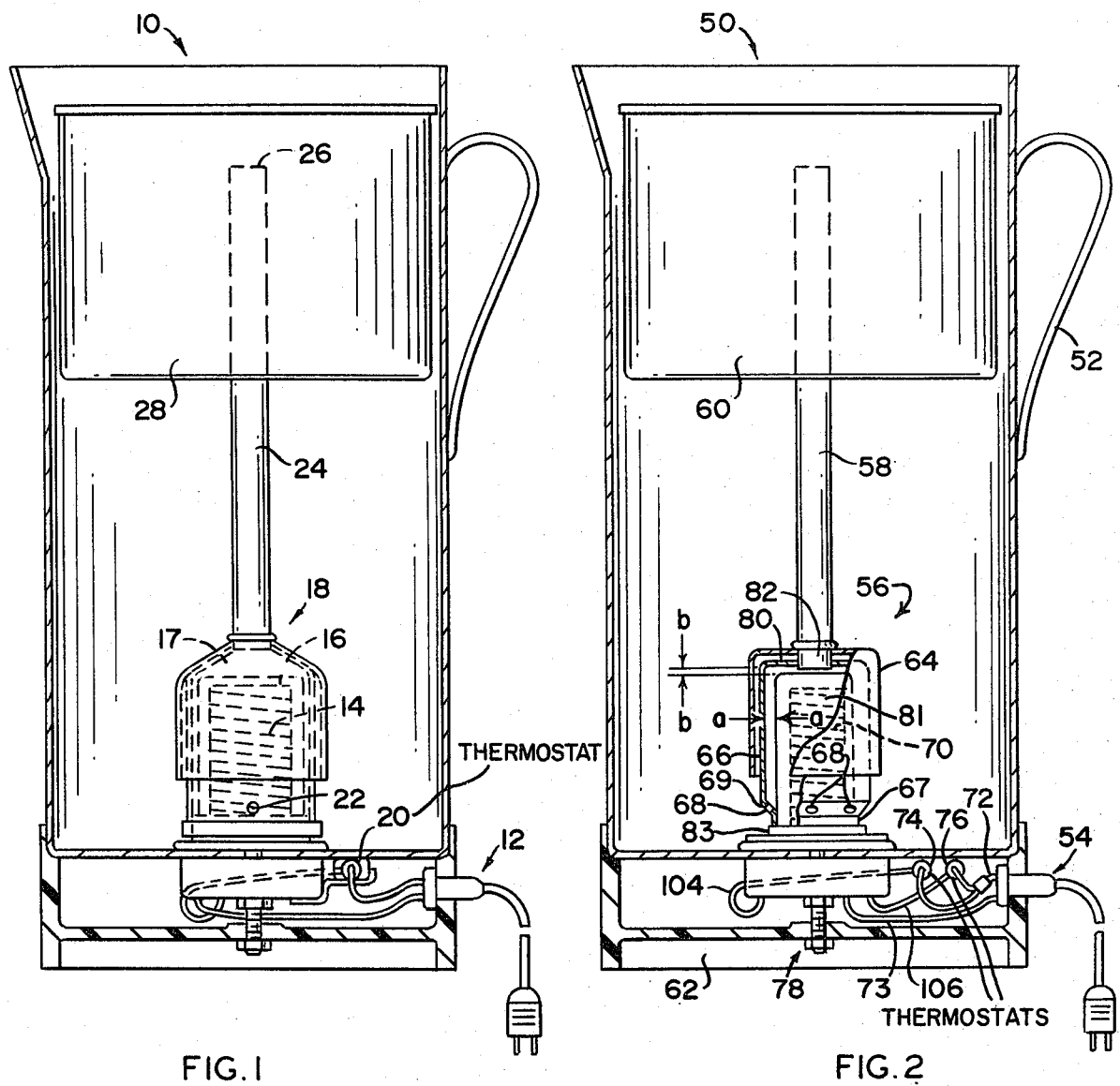
FIG. 1 (PRIOR ART)
FIG. 2
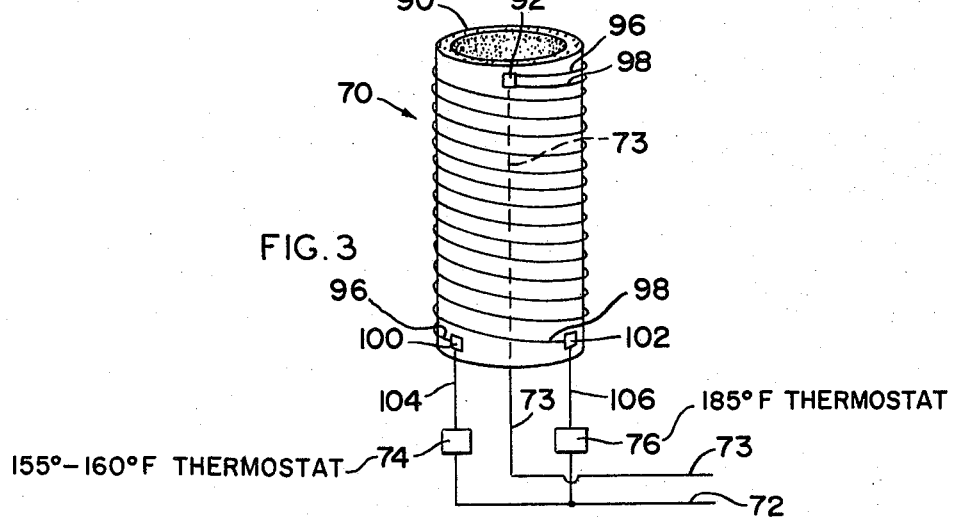
FIG. 3

FOUNTAIN PUMP FOR ELECTRIC COFFEE PERCOLATORS

The present application is a continuation-in-part of our prior application Ser. No. 877,315, filed Feb. 13, 1978, now abandoned and which was a continuation-in-part of our prior application Ser. No. 704,461, filed July 12, 1976, and now abandoned.

BACKGROUND OF INVENTION

Throughout the world, coffee has become one of the most popular and widely used beverages known to man. In spite of its popularity, and further in spite of the fact that the beverage has been known for several hundred years, the brewing of the beverage from the natural coffee bean is limited to two basic techniques, the drip and percolator brewing methods. As is well known in the art, the drip method of brewing coffee, which has become quite popular in recent years, is achieved by making a single pass of hot water (somewhat below the boiling point) over the coffee grounds and into a receptacle such as a glass carafe. The other method of brewing coffee from natural grounds is that of percolation and it is with such method that the present invention is concerned.

Referring now to FIG. 1, a prior art embodiment of an electric coffee percolator may be seen. Such a percolator, designated generally by the numeral 10, is operated from an AC current via a plug assembly 12 which is functional to make engagement with any standard electrical outlet. Current is passed through the plug system 12 to heating coils 14 wrapped about a heater core 16 in a case 17 received within a pump assembly 18. Application of power to the heating coil 14 is under control of a thermostat 20 which is most commonly positioned somewhere along the bottom of the percolator receptacle 10. Water passes into the confines of the pump 18 via a single orifice 22 positioned at the bottom thereof. Of course, the water entering the pump via the passageway 22 seeks its own level within the stem 24. This water encircling the heating element 14, 16 is heated to the steaming or boiling point at which time a discharge is made upward through the stem 24, forcing a head of hot water therefrom, out of the top of the stem 26, and over coffee grounds positioned within a strainer basket 28. Coffee brew then drips from the strainer basket 28 and into the water contained within the container 10. It should be understood that as water is forced up through the stem 24 and out the opening 26, a back pressure within the pump assembly 18 forces some of the fluid contained therein out through the orifice 22. More water is then drawn back in through the orifice 22 to allow the water within the stem 24 to seek its own level and the percolation cycle continues until the brew contained within the container 10 reaches a particular temperature as determined by the thermostat 20.

Certain inherent problems exist within the structure of the prior art. First, and again referring to FIG. 1, the heating chamber or pump 18 has but a single standard hole 22 provided therein, the hole providing for the ingress and egress of fluid thereinto. As noted above, when the fluid within the chamber perks up through the opening 26, a back pressure forces a certain amount of the liquid out of the hole. Since there is but a single hole 22, it has been found that much fluid remains within the heating chamber 18 on a side opposite the heating element 14, 16 from the hole 22. This coffee brew may remain in such position for a number of perk cycles without being ejected through the stem 24 or the orifice 22. The coffee bean oils contained in the liquid or brew being processed have a tendency to burn from overheating and, hence, cause the brew to become bitter or distasteful. Further, the dome-shaped cover of the heating element 18 allows sporadic emission of steam past the core 16 and upwards through the stem 24. There is no chamber provided by the confines of the pump 18 to accummulate and retain steam.

A further problem inherent with the structure of FIG. 1 is that the single orifice 22 may be in alignment with the thermostat 20 such that hot fluid is forced through the orifice 22 and onto the thermostat 20 after percolation. The coffee brew being forced out of the heating chamber is, in all likelihood, somewhat hotter than the coffee contained within the container 10 proper and hence gives a false reading to the thermostat 20 that the coffee may be near the final temperature. Also, with a single orifice 20 being provided, the cycling of brew through the heating compartment 18 and over the grounds contained within the basket 28 comes from but a single area within the container 10 and there is little agitation or mixing of the brew to minimize thermal stratification.

Further inherent problems with the prior art depicted in FIG. 1 stem from the utilization of a single heating element 14, 16 having but a single power dissipation associated therewith. If, for example, the element 14, 16 is a 600 watt element, then 600 watts of power are utilized to generate the heat necessary for not only heating the coffee to the brewing temperature but to maintain it at that temperature once the brew is completed. A problem exists in such a structure in that as the hot brew enters the orifice 22 and flows near the heating element 14, 16, a high power heater will cause the hot brew to immediately steam upon contact; the steam being dissipated up through the stem 24. As is well known to those skilled in the art, the best coffee brew is extracted from those oils within the coffee bean which are most volatile and hence the steaming coffee allows the most tasteful portion of the brew to escape. Although such a steaming effect gives a pleasant odor, it results in a diminution of coffee quality. Consequently, we have found that the utilization of but a single wattage heating element 14, 16 is undesirable.

Further, at the upper end of the brewing cycle, steam overextracts plus burns the already extracted oil.

It is a particular object of the instant invention to overcome the shortcomings in the prior art by presenting a coffee brewing device wherein the percolator pump is characterized by the presence of a plurality of evenly spaced orifices about the base thereof.

A further object of the invention is to present a coffee brewing device wherein the pump is characterized by a steam accumulator at the top thereof for accumulating steam until there is sufficient steam to cause an even cyclical surging of coffee up through the pump steam on a percolation cycle.

Yet another object of the invention is to present a coffee brewing device wherein a dual element heater assembly is utilized in conjunction with a dual thermostat configuration such that the temperature of the brew is initially raised by a high wattage heater while the final brewing cycle itself, above approximately 160° F., is completed via a lower wattage heater.

Still another object of the invention is to present a beverage brewing device wherein the percolation cycle begins almost immediately upon actuation of the device, yet wherein the total brewing time is commensurate with state of the art devices, even though the brewing is completed by a lower wattage heater.

It is another object of the present invention to use uniform temperature water for percolating or pumping action in making coffee by a percolating process. It further is an object of the invention to maintain good circulation of water around the electric heater in the fountain pump to prevent any hot spots from developing in the water around the base of the heater.

Yet another object of the invention is to totally flush the water out of the pump enclosure with different pump cycles, and to heat a cylinder of water by the heater to provide a rhythmatic pumping action that is substantially equivalent to a reciprocating pumping action in the small electric heater-pump construction of the invention, and to provide a regular pumping action moving substantially all water as the pumped material.

A further object of the invention is to present a beverage brewing device which is relatively inexpensive to construct, accurate and dependable in operation, and capable of brewing coffee by percolation such that the same has a drip brewed taste quality.

These objects and other objects which will become apparent as the detailed description proceeds are achieved by apparatus for brewing coffee including a pot for receiving liquid therein; a flat-topped cylindrical member centrally positioned at the bottom of said pot, and having a plurality of uniform holes spaced about the bottom thereof providing for communication between the pot and the inside of said cylindrical member, a stem depending a short distance into said cylindrical member and extending from the top thereof for supporting a strainer thereon.

Dual element heating means are contained within a heater positioned on the bottom of the pot and supporting said member for heating water passing through the holes into the cylindrical member, said heating means being controlled by dual temperature thermostats having two preset operating temperatures. Six to ten holes are present and they have a total area of between about 0.0258 and 0.043 square inches. The flat top of the cylindrical member is spaced about 1/16" to ⅛" from a flat top on the heater.

DESCRIPTION OF THE DRAWINGS

For a complete understanding of the objects, structures and techniques of the invention, reference should be had to the following detailed description and accompanying drawings wherein:

FIG. 1 is a diagrammatic view of a prior art embodiment of a coffee percolator;

FIG. 2 is a cut-away view of a percolator utilizing the embodiments of the instant invention; and, FIG. 3 is a perspective view of a two element heater assembly which may be incorporated within the structure of FIG. 2, the enclosure of the heater being removed.

DETAILED DESCRIPTION OF THE PREFERRED EMBODIMENT

Referring now to FIG. 2, the teachings of the instant invention may be seen as the same are incorporated in a percolator system designated generally by the numeral 50. While the carafe structure of the percolator 50 may take on any of various embodiments, such systems standardly utilize a handle 52 for movement of the unit and a base 62 through which is applied electrical power via a plug 54 or the like. Similarly incorporated in the structure of the invention, as in the prior art, is a pump 56 feeding to a stem 58 extending upward to a strainer basket 60.

With particular attention now being drawn to the pump 56, it will be noted that the same may include a thermal shield 64 encompassing the cylindrically-shaped pump housing 66. If the structure 66 is of aluminum construction, such a shield 64 is desirable. However, on those units wherein the housing 66 is of a stainless steel construction, the shield may be omitted. Aluminum, being a good thermal conductor, requires the shield 64 to provide an insulating air pocket about the pump housing 66 so as to maintain the heat within the pump and not allow the dissipation of the same throughout the liquid contained within the unit 50. The better insulating characteristics of stainless steel allow the insulating shield 64 to be omitted.

The pump housing 66 is characterized by the presence of a plurality of holes or orifices 68 uniformly spaced about a bottom portion thereof and providing for liquid flow communication between the carafe portion of the unit 50 and the interior of the pump 56. A heater 70, which may be a single or preferably a dual element heater, is maintained within the pump 56 and activated by electrical wires 72 and 73 in conductive connection with the plug 54 under control of a thermostat or thermostats 74, 76. The heater element 70 is fixedly secured to the bottom of unit 50 in a standard manner utilizing nut and bolt engagement 78 passing through the base 62.

With particular reference to the pump 56, and the plurality of orifices 68 at the bottom thereof, it should be appreciated that such an embodiment vastly increases both the volume and uniformity of liquid flow into and out of the pump. While in the prior art, as depicted in FIG. 1, a single large hole is utilized for such communication, it has been found that a plurality of smaller diameter holes may achieve both objects of increased volume and flow uniformity. Previous embodiments utilize a single #35 hole providing 0.0095 square inches of flow area. By utilizing the teachings of the instant invention and incorporating 6 to 10 smaller holes (#48), of about 0.0043 square inch each, a total flow area of about 0.258 to 0.043 square inches may be achieved. Thus, this specific embodiment of the invention provides 4.53 times the flow area as did the prior art units, but any embodiment of the invention would have between about 2.5 to about 4.53 times the flow area of the prior art pump. This provides for a greater surge of coffee or brew upward through the stem 58 and down upon the grounds contained within the strainer 60. Further, with the holes 68 being evenly spaced about the bottom of the housing 66, the back pressure within the pump 56 forces brew uniformly from the interior of the pump housing 66 and hence there is no likelihood of brew staying in any one position within the pump and burning. Yet further, the fountain-like flow of liquid through the orifices 68 causes a uniform agitation of the beverage contained within the unit 50 and thus provides for a homogeneous temperature blend of the beverage. Still further, the temperature of the beverage within the container 50 remains more uniform since the hot liquid immediately adjacent the heater 70 is dispensed radially from the pump 56 from a plurality of evenly spaced holes 68 and there is less likelihood of a false reading being made by the thermostats 74, 76.

It has been found that evenly spaced holes, and usually from 6 to 10 holes 68, are preferable. The diameter of the holes may also vary but are dependent on the power rating of the heating element, preferably being directly proportional thereto since a higher temperature within the pump results in a greater back pressure and requisite flow path area.

With reference again to the pump 56, it should be noted that, in contrast to the prior art of FIG. 1, the instant invention teaches a flatheaded pump having the appearance of an inverted jar and being basically cylindrical rather than conical in nature. The cone-shaped pump 18 of the prior art is of such nature that the steam bubbles generated by the heating liquid within the pump may rise along the conically shaped wall and up the stem 24. It has been found in the prior art that when the liquid within the unit 10 exceeds 160° F., the liquid within the pump 18 steams rapidly such that steam bubbles or clusters follow the tapered walls of the pump 18 and pass upwardly through the stem 24 in increasingly rapid succession. It is at this temperature that the prior art unit went into a spitting or sporadic percolation mode. Brewing effectiveness is greatly diminished at this point, and frequently nearly totally diminished. The ready escape of the steam bubbles up the tapered wall of the pump result in no unified pressure to push up the column of water in a true pumping function. Thus, the unit steams and does not pump. On the contrary, the flat top 80 of the pump 56 does not facilitate the escapement of such steam clusters but rather has a tendency to accumulate the steam about such top surface in a unified cluster such that, upon the emission of the first portion of steam escaping through the stem 58, the entire cluster is so dispersed pushing a solid head of brew up and over the coffee grounds. There is therefore a steam chamber effectively created by virtue of the flat top surface 80 of the pump housing 66.

It has been found that the steam chamber may be accentuated by allowing the stem 58 to depend below the top surface 80 as at 82. The distance by which the stem 58 depends below the surface 80 determines the size of the steam chamber created thereby and hence the volume of steam urged upward through the stem 58 when the chamber becomes full. It has also been found that the amount of clearance between the top of the heating element 70 and the surface 80 is important for achieving the steam chamber or accumulator objective. While this dimension may vary somewhat, it has been found that the separation between the surfaces should be between 1/16 inch to $\frac{1}{8}$ inch. By utilizing the structure depicted in FIG. 2 rather than the prior art embodiments, the spitting or sporadic percolation of prior art units is alleviated and a cyclical surging percolation is achieved over the entire temperature range of the brewing cycle, normally through 185° F. and through 200° F., if desired.

A further characteristic of the structure of the instant invention is the utilization of the heater 70 that is controlled by dual thermostats 74, 76. In the prior art, a single wattage heating element has been utilized and, in order to achieve a rapid brew, this element has been high wattage, i.e., up to 1,000 watts. A problem exists, however, in that when hot water hits the high wattage heating element, there is a tendency to rapidly create a steam which carries away with it the most tasteful oils of the coffee brew; these oils being those which are most volatile, and which action also results in loss of this steam up the pump stem, as described before, and a resultant stagnation of the brew around the heater with resultant burning of the coffee oils. Thus, the coffee has a bitter taste. There is therefore a necessity of trading off brewing time against coffee taste when selecting the size of the heating element.

The heater 70 has its enclosure container indicated at 81. Conventional filler material surrounds and positions a suitable core 90 in the enclosure can 81 in a conventional manner.

The heater can or enclosure 81 is of conventional size and it supports the pump housing 66 by means of a reduced diameter lower edge ring 67 on the enclosure 66 engaging a base flange 83 on the heater can. Such base ring 67 is formed by confining or working the enclosure 66 to provide a downwardly and inwardly slanted conical section 69 thereon that tapers at an angle of about 45° to the horizontal. As an important feature of the invention, the various flushing or flow control holes 68 are all formed in this conical section 69 so that such holes are downwardly and outwardly facing with relation to the pump enclosure and can 81. It also should be noted that this conical section 69 is of such a length and angle that the radial distance a—a between the adjacent surfaces of the heater or pump housing 66 and the outer surface of the heater can would amount to, approximately, somewhere in the vicinity of about 0.15 to about 0.20 inch whereas the space b—b between the top surface of the heater can and the adjacent flat surface 80 of the pump housing normally is about $\frac{1}{8}$ to 1/16 inch. Or, in other words, a greater thickness or layer of water lies adjacent the periphery of the heater can for heating and pumping action than lies on the top of the can for ultimate pumping up through the stem 58. And the tubular body of water being heated in the pump housing is of greater length than the diameter of the can 81.

It should be appreciated that as steam forms from the tube of water being heated in the confined space provided by the pump housing 66, small bubbles of steam will be produced and will rise upwardly of the pump housing to collect between the adjacent horizontal surface 80 and the top of the heater can. Then when sufficient steam bubbles have formed to provide pressure for forcing water up the stem 58 in the desired pump action, the steam will force a slug of water up the stem 58 which will spread out over the container 28 and its contents to drop or flow down therethrough for coffee brewing action. Such water will be heated to a relatively high temperature close to boiling without actually boiling. At the same time as the steam expels a slug of water upwardly through the stem 58, likewise the steam forces water downwardly between the enclosure 66 and the heater can 81 and out through the holes 68. Such pulses of water going both up and downwardly in relation to the pump chamber causes a thorough replacement of the water in the pump chamber with each actual pump cycle. Hence, a uniform heating action will be obtained and a rhythmatical pumping action results as water flows smoothly and readily into and out of the pump chamber to provide substantially uniform temperature water pushed up through the stem 24 for coffee brewing action. Such action results at a normal operating heating condition of about 160° to 180° F.

One of the disadvantages in prior art pumps in coffee makers has been that under quite a few operating conditions, the pumps only moved steam with a minimal of water content and provided undesirable high temperatures in the fluid material contacting the coffee for percolating action and producing ultimate burning of the coffee and extracting rancid oils therefrom. This is avoided by the present invention.

Referring to FIG. 3, the dual element heater 70 is shown in more detail with its enclosure 81 removed. The core, preferably made of ceramic, has a number of turns of heating element wire wrapped around it; the number of turns dependent upon the wattage desired. This wire, of course, is well known in the art and is typical of #25 gauge and of nickel/chrome alloy. A common terminal 92 is provided at the top of the core 90 and is in communication with the electrical wire 73 passing through the open center of the core 90 to a power supply terminal. Extending from such terminal 92 are two heating wires 96, 98 with the wire 96 terminating at terminal 100 and the wire 98 terminating at the terminal 102 at the bottom of the core 90. The terminal 100 is connected to the thermostat 74 via the wire 104 while the terminal 102 is connected to the thermostat 76 via the wire 106. It should be appreciated that there is presented by the heater 70 two separate and distinct heating elements, one being in addition to the wattage of the other. By passing current through both sets of parallel wound heating element wires 96, 98, the maximum wattage is achieved. Also, the wires 96, 98, which by their parallel winding pattern provide equal heat distribution to the wall of the heater case whether one or the other, or both are heating, and so provide minimum heat density per square inch for the wattage involved.

When power is first applied, both element 96 and element 98 are energized. When vessel brew temperature reaches approximately 155° F./160° F., element 96 is disconnected by the opening action of thermostat 74 that is in series with element 96. Element 98 continues operation until vessel brew temperature teaches approximately 185° F., at which time element 98 is disconnected and cycled on-off by the opening action of thermostat 76 in series with element 98.

For the keep warm function, thermostat 76 cycles continuously at 185° F. and thereby cycles heater element 98, hence maintaining the vessel brew temperature at 185° F. Thus, the heater 70 provides for bringing the liquid within the container 50 up to an initial brewing point in rapid time under control of maximum power dissipation by the heater. When the liquid nears this brewing temperature, the wattage is substantially reduced so the brew may be completed without the steaming problem and loss of flavor.

The manufacturing advantage of winding two identical or similar elements 96 and 98, and starting from a common initial winding point, makes the heater 70 economical to produce but yet it has very desirable characteristics as set forth hereinbefore. Only one additional terminal lead is required with the dual winding. The heater winding time is essentially that of a single element heater. The voltage potential between each coiled strand of the elements 96 and 98 is only about 3 volts when 35 turns are used, and with this low potential the wires may be wound quite closely and they are held in place by the magnesium oxide filler in the heater case.

An alternate is winding one half of the length of the core with one coil, and the other half with a continuing coil, having terminal leads from each end and also the center of the coil.

Thus, it can be seen that the objects of the invention have been satisfied with the structure and associated technique presented hereinabove.

While in accordance with the patent statutues, only the best mode and preferred embodiments of the invention have been presented and described in detail, it is to be understood that the invention is not limited thereto or thereby. Consequently, for an appreciation of the true scope and breadth of the invention, reference should be had to the following claims.

What is claimed is:

1. Apparatus for making coffee brew from coffee grounds comprising:
    a container having a top and a bottom;
    an upwardly projecting, flat-topped, cylindrical encased heating element centrally received within the container and maintained at the bottom thereof;
    a flat-topped, open bottom, cylindrical member supported on the heating element, said cylindrical member surrounding said heating element in spaced relation thereto, the cylindrical member having a hollow stem in communication with the interior thereof and extending upwardly from the center of the flat top, the flat-topped cylindrical member being spaced from the top of the heating element from between 1/16" and ⅛" to form a chamber for receiving and retaining a volume of steam bubbles therein, said stem having a lower end that protrudes into the said space between the top of said heating element and the flat top of said cylindrical member, and the side wall of the cylindrical member being characterized by a conically inwardly and downwardly extending lower end fluid-tightly circumferentially engaging the sidewall of the heating element and by six to ten uniformly circumferentially spaced uniform holes in the conical portion of said lower end such that said holes are downwardly and outwardly facing with relation to the heating element, the total area of said holes being between about 0.0258 and 0.043 square inches.

2. Apparatus as in claim 1 where said cylindrical member is concentric with and spaced radially from said cylindrical encased heating element a greater distance than the spacing of the flat tops of said cylindrical encased heating element and said cylindrical member.

3. A device for brewing coffee, comprising:
    a brewing container having a top and a bottom;
    a heater means comprising a heating element; a cylindrical metal enclosure container that has a flat top and in which said heating element is positioned, the heater means being within said brewing container and projecting upwardly from the bottom thereof, and
    a pump assembly including a housing having a top, a side wall, and a stem extending vertically from said top and a strainer basket supported at the upper end of the stem, the housing being supported on a lower portion of the enclosure container and surrounding said enclosure container in spaced concentric relationship therewith, the housing sidewall having a conically shaped lower end section inwardly and downwardly tapering towards said enclosure container into fluid tight circumferential engagement therewith and having 6 to 10 relatively small diameter uniform holes uniformly spaced about the circumference of and formed in the conically shaped lower end of the housing for communication between the container and the interior of the pump assembly, said holes facing downwardly and outwardly with respect to said enclosure container, the housing being cylindrical and having a flat top spaced uniformly from said top of said enclosure container, and the top of the housing being cylindrical and having a flat top spaced uniformly from said top of said enclosure container, and the top of the housing being spaced between 1/16 inch to ⅛ inch vertically above the top of the enclosure container of the heating element and the stem extending below said flat top of said housing and communicating with the space between the said tops; said housing and enclosure container being space radially a greater distance than the spacing of the housing from the top of the container; the total area of said holes being between about 0.0258 and 0.043 square inch.

* * * * *